US005242660A

United States Patent [19]

Hsei

[11] Patent Number: 5,242,660

[45] Date of Patent: Sep. 7, 1993

[54] SAMPLE PREPARATION DEVICE

[76] Inventor: Paul Hsei, 20491 Graystone La., Huntington Beach, Calif. 92646

[21] Appl. No.: 843,241

[22] Filed: Feb. 28, 1992

[51] Int. Cl.[5] .......................... B01L 3/00; G01N 9/30; G01N 35/00

[52] U.S. Cl. ...................................... 422/102; 422/72; 422/103; 436/45; 494/16; 494/20; 494/31; 494/33; 494/44; 206/221; 220/8; 366/167; 366/208; 366/214

[58] Field of Search ............................ 206/221; 220/8; 366/167, 208, 214; 422/64, 72, 102, 103, 161; 436/45; 494/16, 20, 31, 33, 44

[56] References Cited

U.S. PATENT DOCUMENTS 4,749,658 6/1988 Jaekel et al. ........................ 436/180

*Primary Examiner*—James C. Housel

*Assistant Examiner*—Milton I. Cano

*Attorney, Agent, or Firm*—J. E. Brunton

[57] ABSTRACT

A sample preparation device for precisely measuring a sample volume, mixing the sample with a reagent and then separating out any resulting precipitant from the sample. In using the device, the sample is nonquantitatively dispensed by the user and is volumetrically delivered by the device using a positive displacement method. No vortexing or shaking is required and the sample and reagent are precisely and reproducibly mixed automatically.

9 Claims, 4 Drawing Sheets

SAMPLE PREPARATION DEVICE

BACKGROUND OF THE INVENTION

1. Field of the Invention

The present invention relates generally to sample preparation devices. More particularly, the invention concerns a disposable sample preparation device which precisely measures a volume of sample, mixes it with prepackaged reagent, and then separates any resulting precipitant or particles from the sample.

2. Discussion of the Invention

There is a substantial need in chemical analysis to perform many different types of high volume colorimetric assays which require the addition of one or two reagents to a sample. These assays include: albumin, total protein, iron, phosphorous, and magnesium in serum, plasma, or urine. Adolase, amylase and acid phosphates are additional examples of enzymes which may be assayed in these body fluids. Each of these assays employs one or two stable reagents having a long shelf life.

Recently the National Institute of Health and the Center for Disease Control has identified serum high density lipoprotein (HDL) concentration as an important indicator for coronary heart disease. Public awareness of the importance of HDL, through the National Cholesterol Education Program and other media, has created a substantial demand for this test. Prior art methods available for serum HDL measurement require intricate sample preparation procedures and the cost and accuracy of HDL measurements rely heavily upon the skills of the individual charged with the execution of sample preparation. Therefore, a substantial need exists for a device which can reduce the reliance on labor intensive sample preparation techniques for HDL measurement.

A major thrust of the present invention is to provide a sample preparation device which overcomes prior art drawbacks of the character discussed in the preceding paragraph and to provide a simple and easy to use, yet highly accurate device, capable of accomplishing a number of different types of sample preparation tasks.

SUMMARY OF THE INVENTION

It is an object of the present invention to provide a novel sample preparation device for precisely measuring a sample volume, mixing the sample with a reagent and then, when necessary, separating out any resulting precipitant from the sample.

Another object of the invention is to provide a device of the aforementioned character which is of simple construction and one which can be used by technicians of ordinary skill.

Another object of the invention is to provide a device of the type described in which errors and imprecision arising from differences in individual technique will be reduced because the sample and reagent are precisely dispensed, mixed and separated by the device itself.

Another object of the invention is to provide a sample preparation device which will accommodate reagents prepackaged in unit doses. Such prepacked reagents may include polypeptides and polynuckotides immobilized on the surface of this invention.

Another object of the invention is to provide a device of the class described in which the sample is nonquantitatively dispensed by the user and is volumetrically delivered by the device using a positive displacement method.

Still another object of the invention is to provide a device of the character described in the preceding paragraphs in which no vortexing or shaking is required and in which the sample and reagent are precisely and reproducibly mixed automatically.

Yet another object of the invention is to provide a sample preparation device which can be inexpensively produced so that the device can be economically disposed of after the mixing operation.

Another object of the device is to allow spectrophotometric measurements to be made directly on the device thereby eliminating the need for a separate cuvette and a second sample transfer step.

DESCRIPTION OF THE INVENTION

Figure 1:
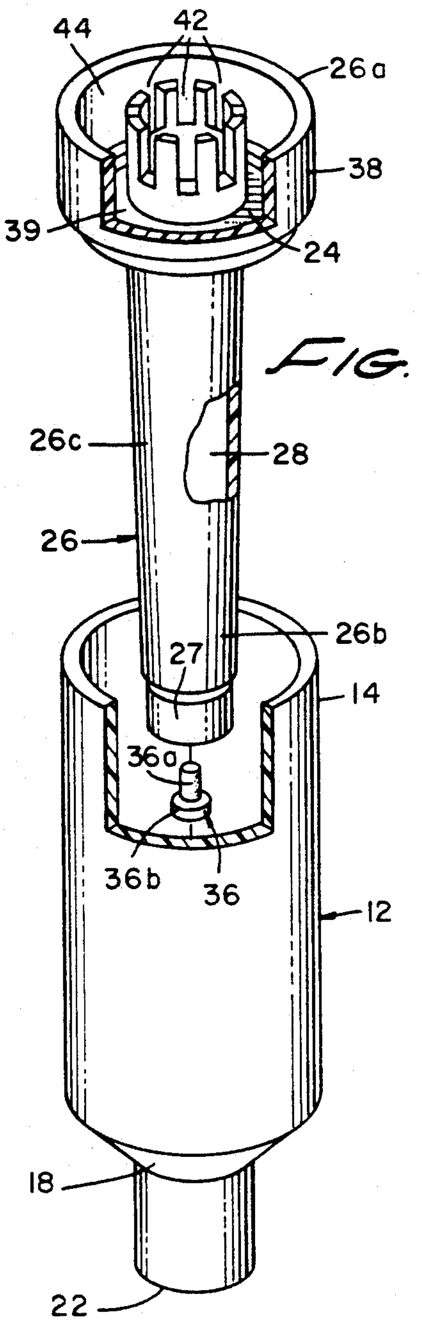
FIG. 1 is a generally perspective exploded view of one form of the sample preparation device of the invention partly broken away to show internal construction.
Figure 2:
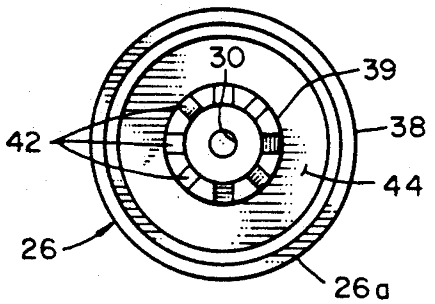
FIG. 2 is a top view of the form of the apparatus shown in FIG. 1.
Figure 3:
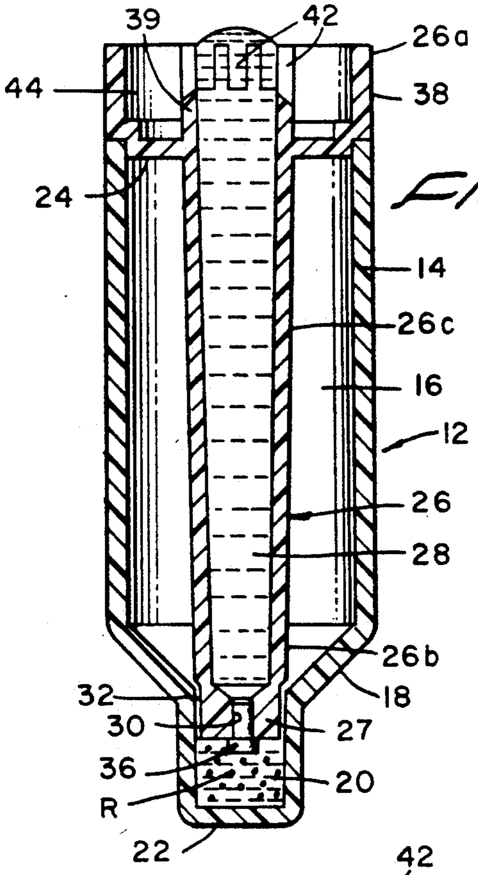
FIG. 3 is a cross-sectional view of the device showing the sample in one chamber of the device and the reagent to be mixed with the sample in another chamber of the device.

Referring to the drawings and particularly to FIGS. 1, 2 and 3, the sample preparation device of one form of the invention is there illustrated. In this form of the invention, the device comprises a first outer container 12 having upper generally cylindrically shaped outer walls 14 defining a first, or intermixing chamber 16.

Container 12 includes walls 18 which define a frusto-conical section that interconnects upper or first chamber 16 with a second, or reagent chamber 20. A bottom wall 22 closes lower reagent chamber 20 and an upper wall 24, of a character presently to be described closes upper chamber 16.

Figure 5:
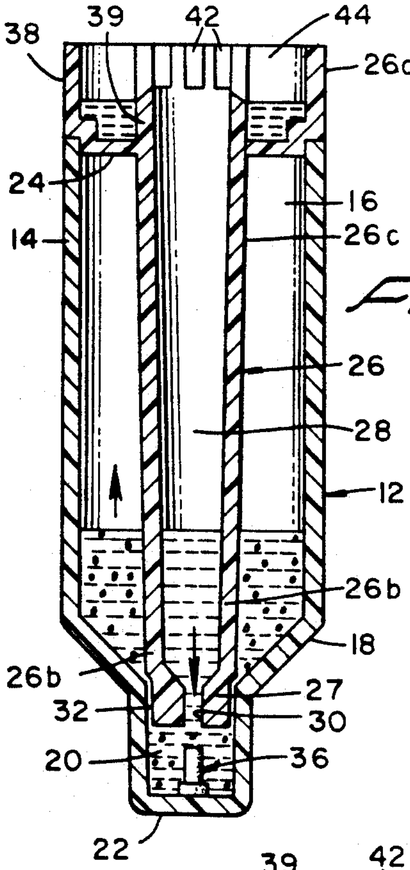
FIG. 5 is a cross-sectional view similar to FIG. 4 but illustrating the initial mixing step during the second centrifuge wherein the sample and reagent are intermixed.

The device of the invention also includes a second container 26 which comprises a first or upper portion 26a, a second or lower portion 26b and an intermediate portion 26c. Second container 26 includes an internal sample chamber 28 which is open at its upper end 26a and closed at its lower end by a wall 27. As is best seen in FIG. 5, wall 27 is provided with an axially extending first passageway 30. As indicated in FIG. 5, second portion 26b of second container 26 is receivable within the upper portion of chamber 20 of the first container. When second container 26 is so positioned within the first container, axial passageway 30 can functions to permit fluid communication between internal sample chamber 28 of the second container and lower or reagent chamber 20 of the first container. In like manner, when second container 26 is correctly positioned within the first container, there is defined an annular passageway 32 which permits fluid communication between lower chamber 20 (FIG. 3) and intermixing chamber 16 of first container 12.

Turning once again to FIG. 3, it is to be noted that passageway 30 is initially closed by a sealing means shown here as an elastomeric member 36. Member 36 can be any configuration such as a ball or a rupturable diaphragm or membrane, but is shown here as a plug having a shank portion 36a and an enlarged diameter head portion 36b. Shank portion 36a is closely receivable within bore 30 and functions to normally block fluid communication between internal chamber 28 of the second container and lower chamber 20 of the first container.

The upper portion 26a of second container 26 includes an enlarged diameter portion 38 which is generally cylindrical in shape and has outer walls which terminate in the previously mentioned partition wall 24 which functions to close the upper end of chamber 16. Enlarged diameter portion 38 circumscribes an upper generally cylindrically shaped portion 39 of second container 26. As best seen in FIGS. 1 and 2, portion 39 is provided with a plurality of circumferential spaced slots 42 which permit fluid communication between chamber 28 of container 26 and an overflow chamber 44 defined internally of cylindrical portion 38 of the second container 26. It is to be understood that a fluid passageway other than slots 42 can be provided such as holes or a single slot in portion 39. The purpose of this overflow chamber 44 will presently be discussed.

Figure 4:
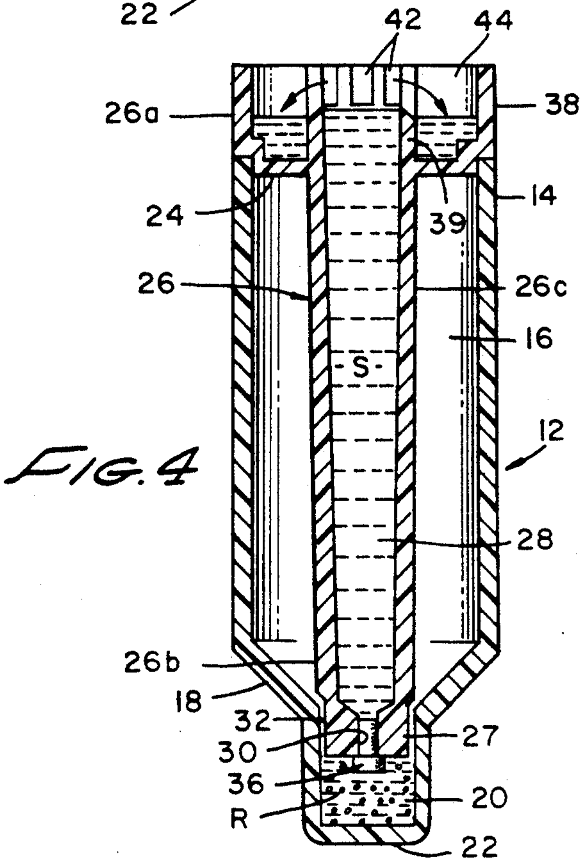
FIG. 4 is a cross-sectional view similar to FIG. 3 but showing the overflow of the sample into an overflow chamber upon execution of the first centrifuge.

Referring now to FIG. 3, chamber 20 of the device contains a precisely measured volume of a selected reagent R. With the sealing means or plug 36 in place as shown in FIG. 3, chamber 20 is effectively sealed from chamber. With the plug 36 in place, chamber 28 is filled to overflowing with the selected sample S which is to be processed. The device is then placed in a centrifuge and initially spun for a very short time at a moderate rate. During this initial centrifuge period, some of the sample S will flow through slots 42 and into the overflow chamber 44 in the manner illustrated in FIG. 4. This results in a precise volumetric amount of the sample S remaining within chamber 28.

Figure 6:
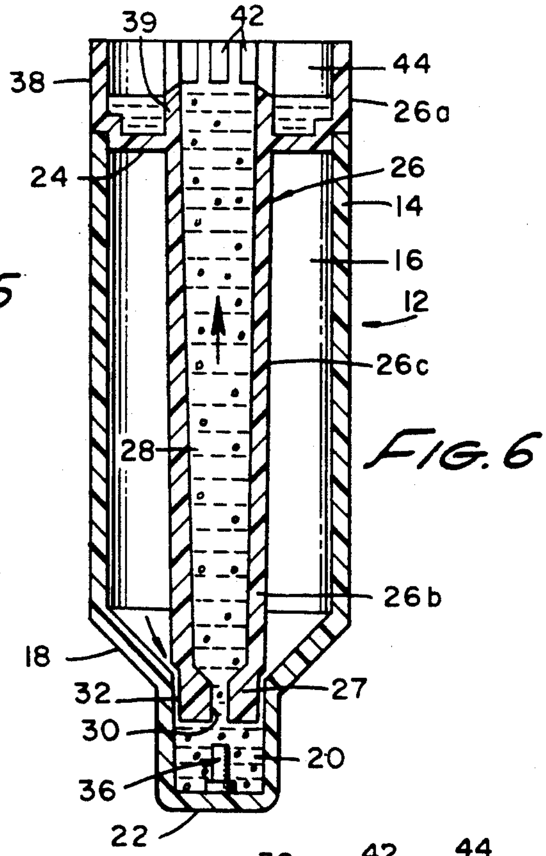
FIG. 6 is a cross-sectional view similar to FIG. 5 illustrating the return flow of the intermixed fluids into the first and second chambers.

As the centrifuge continues to accelerate, the force continues to increase until a point is reached where the sealing means or plug 36 is forced out of sealing engagement with passageway 30 and into chamber 20 in the manner shown in FIG. 5. This, of course, opens communication between chambers 20 and 28 and between chambers 20 and 16. This centrifugal force will expel the sample S from chamber 28, through passageway 30, into the reagent chamber 20 and then outwardly through passageway 32 into chamber 16. This rapid flow of the sample S into the reagent chamber causes thorough intermixing of the sample with the reagent. Because chamber 16 is sealed to atmosphere, the air within the chamber will be compressed as the fluid is forced into chamber 16. Accordingly, when the centrifuge is stopped, the compressed air within chamber 16 will cause the intermixed fluids to return to chambers 20 and 28 in the manner illustrated in FIG. 6. Once again, any excess fluids will flow through slots 42 into the overflow chamber 44. Colorimetric assays may be conveniently taken at this time. In certain constructions, fluid flow also freely takes place between lower portion 26b of second container 26 and the inner walls of chamber 20 thereby further enhancing the mixing of the sample and the reagent.

Figure 7:
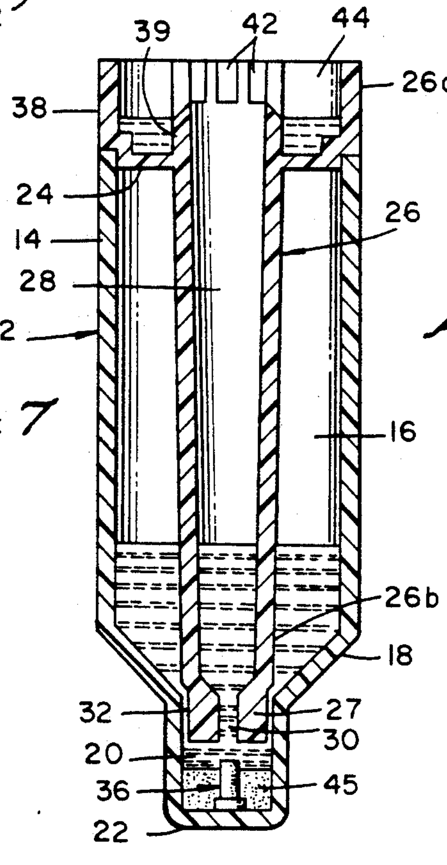
FIG. 7 is a cross-sectional view similar to FIG. 5 illustrating a final centrifuge step.
Figure 8:
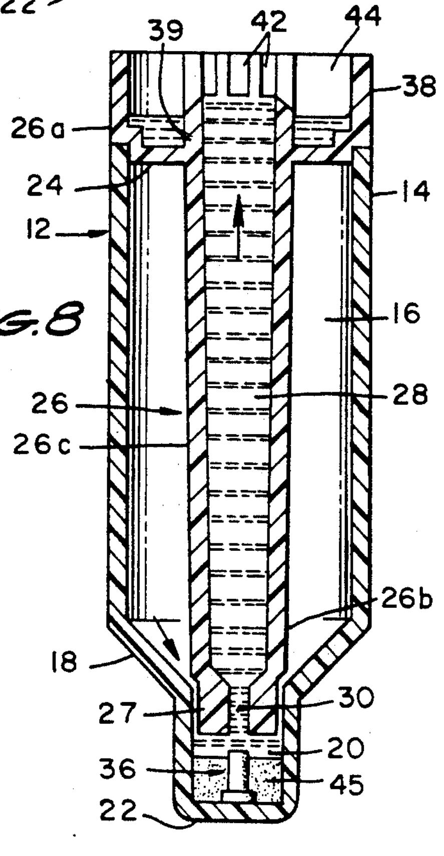
FIG. 8 is a cross-sectional view similar to FIG. 6 illustrating the collection of sedimentation of the precipitant at the bottom of the second chamber following the final centrifuge step.

In most sample preparations, adequate mixing can be achieved using a single centifugal cycle. This is achieved by minimizing the percentage of sample volume that remains in 30. If a second centrifuge step is required, this step is illustrated in FIG. 7 where it can be observed that gravitational forces exerted by the centrifuge will once again cause the intermixed fluids to flow through passageways 30 and 32 and into chamber 16. When the centrifuge is stopped, the compressed air within chamber 16 will again force the intermixed fluids to return to chambers 16 and 20. When the centrifuge is stopped this final time the precipitant free sample will return level with the slots 42 at the top of the sample chamber 28 and may be conveniently removed for measurement of HDL. The sediment designated in FIG. 8 by the numeral 45 remains within the bottom portion of chamber 20.

Turning now to FIGS. 9-14 of the drawings, an alternate embodiment of the invention is there illustrated. In this alternate form of the invention, the device comprises a first outer container 112 having upper generally cylindrically shaped outer walls 114 defining a first, or intermixing chamber 116. Container 112 includes tapering walls 118 which define a frusto-conical section that interconnects upper or first chamber 116 with a second, or reagent chamber 120. A bottom wall 122 closes lower reagent chamber 120 and an upper wall 124, of a character presently to be described, closes upper chamber 116.

Figure 9:
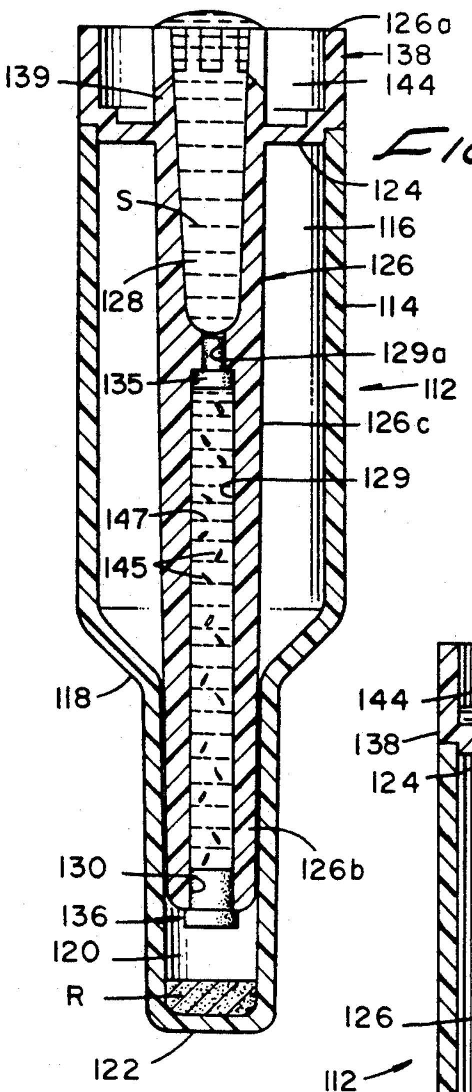
FIG. 9 is a cross-sectional view of an alternate form of sample preparation device of the present invention.

The device of this second form of the invention also includes a second container 126 which comprises a first or upper portion 126a, a second or lower portion 126b and an intermediate portion 126c. Second container 126 includes a first sample chamber 128 which is open at the upper end 126a. A second sample chamber 129 is disposed adjacent chamber 128 and is interconnected therewithin by a fluid passageway 129a. As indicated in FIG. 9, second portion 126b of second container 126 is sealably receivable within the upper portion of chamber 120 of the first container. When second container 126 is so positioned within the first container, an axial passageway 130 functions to permit fluid communication between second sample chamber 129 of the second container and lower or reagent chamber 120 of the first container. Preferably portion 126b of the second container is loosely received within the upper portion so as to permit fluid communication between chamber 129 and intermixing chamber 116 of first container 112 during centrifugation.

A first closure means or elastomeric plug 135 initially closes fluid passageway 129*a* and a second closure means or elastomeric plug 136 initially closes passageway 130. Both plugs 135 and 136 have a shank portion and an enlarged diameter head portion. The shank portion of plug 35 is closely receivable within passageway 129*a* and functions to block fluid communication between first and second chambers 128 and 129 of the second container. The shank portion of plug 36 is closely receivable within passageway 130 and functions to block fluid flow between second chamber 129 and lower chamber 120 of the first container.

Figure 10:
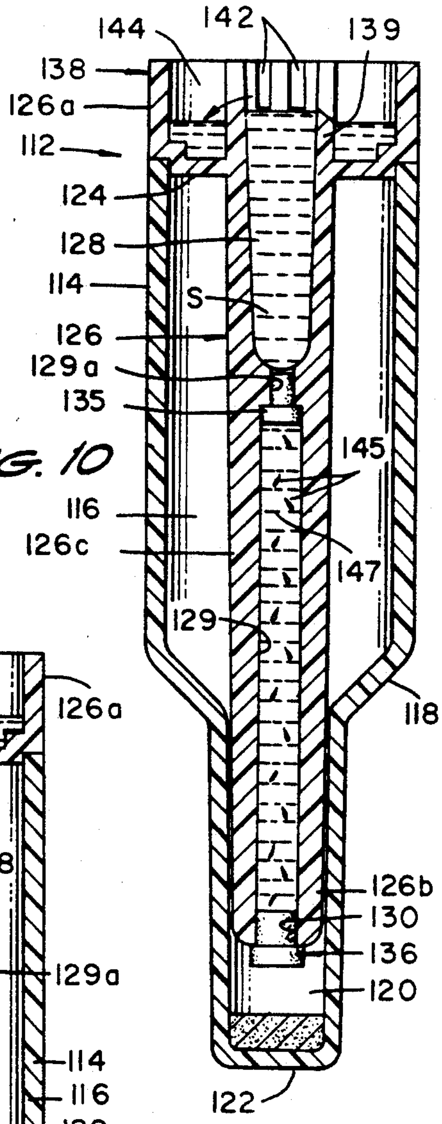
FIG. 10 is a cross-sectional view similar to FIG. 9 illustrating the initial overflow of the sample into the overflow chamber during the initial centrifuge period.
Figure 11:
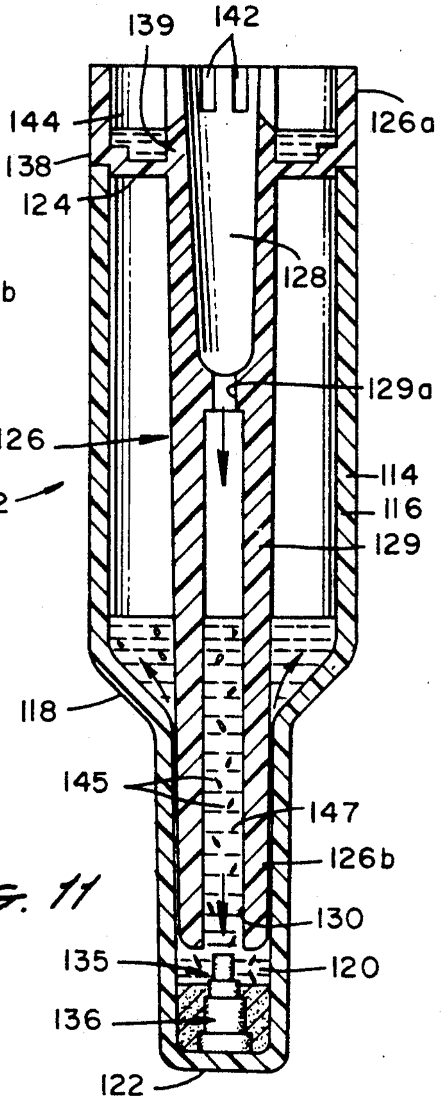
FIG. 11 is a cross-sectional view similar to FIG. 10 illustrating the flow of the fluids within the device during the performance of the second centrifuge period.
Figure 12:
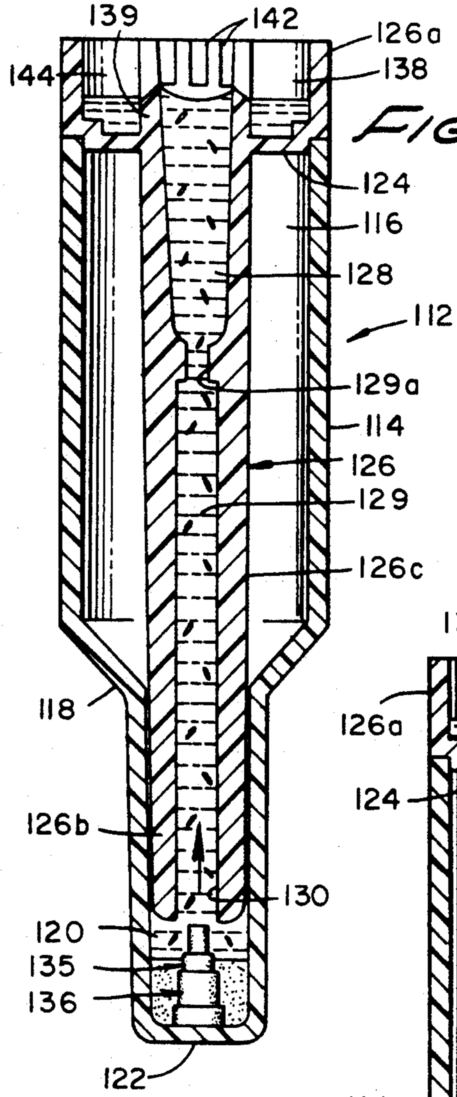
FIG. 12 is a cross-sectional view similar to FIG. 11 illustrating the flow of fluids back into the chambers of the device after the second centrifuge period has been completed.
Figure 13:
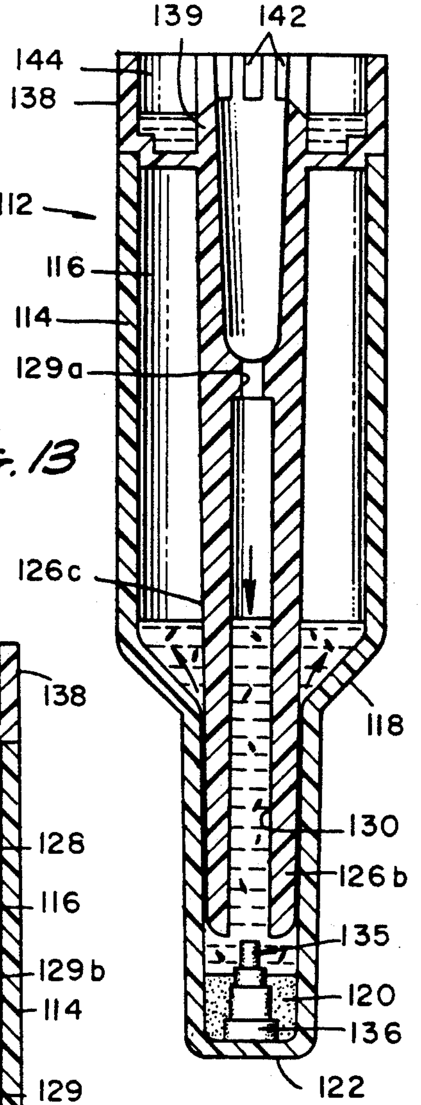
FIG. 13 is a cross-sectional view similar to FIG. 12 illustrating a further centrifuge period.
Figure 14:
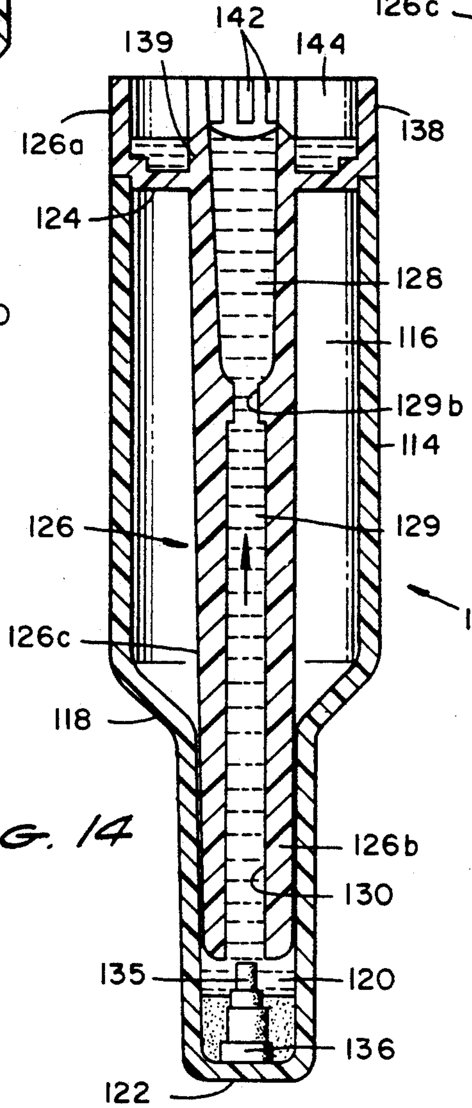
FIG. 14 is a cross-sectional view similar to FIG. 13 illustrating the collection of sedimentation of the percipient at the bottom of the lowest chamber of the device.

The upper portion 126*a* of second container 126 includes an enlarged diameter portion 138 which is generally cylindrical in shape and has outer walls which terminate in the previously mentioned partition wall 124 which functions to close the upper end of chamber 116. Enlarged diameter portion 138 circumscribes an upper generally cylindrically shaped portion 139 of second container 126. As best seen in FIGS. 10 and 11, portion 139 is provided with a plurality of circumferential spaced slots 142 which permit fluid communication between chamber 128 of container 126 and an overflow chamber 144 defined internally of cylindrical portion 138 of the second container 126.

Referring now to FIG. 9, chamber 120 of the device contains a precisely measured volume of a selected reagent R, which in this case is a soluble labeled antibody or antigen. With the sealing means or plug 136 in place as shown in FIG. 9, chamber 120 is effectively sealed from both chambers 129 and 116. In this form of the invention, chamber 129 is filled with styrene latex or other particles 145 suspended in a diluent buffer 147. Particles 145 are bound with an antibody. As before, chamber 128 is filled to overflowing with the selected sample S which is to be processed. As centrifugal force increases, some of the sample S will flow through slots 142 and into the overflow chamber 144 in the manner illustrated in FIG. 10. This results in a precise volumetric amount of the sample S remaining within chamber 128.

As the centrifuge is accelerated, the centrifugal force will continue to increase until a point is reached where both plugs 135 and 136 are forced out of sealing engagement with passageways 129 and 130 and into chamber 112 in the manner shown in FIG. 11. This, of course, opens communication between chambers 120 and 129 and between chambers 120 and 116. This centrifugal force will force the sample S from chamber 128, through passageway 129*a*, through chamber 129, into the reagent chamber 120 and then outwardly past the outer walls of portion 126*b* and into chamber 116. This rapid flow of the sample S into the reagent chamber causes thorough intermixing of the sample with particles 145 and the soluble antibody. Because chamber 116 is sealed to atmosphere, the air within the chamber will be compressed as the fluid is forced into chamber 116. Accordingly, when the centrifuge is stopped and the compressed air within chamber 116 will cause the intermixed fluids to return to chambers 120, 128 and 129 in the manner illustrated in FIG. 12. The soluble labeled antibody is bound to the solid phase in the presence of antigen during an incubation period.

If it is needed, the centrifuge can be started once more to sediment the particles which effectively separates the particles from the unbound labeled antibody. The amount of label remaining in the sample chamber (FIG. 14) is proportional to the amount of antigen present.

Having now described the invention in detail in accordance with the requirements of the patent statutes, those skilled in the art will have no difficulty in making changes and modifications in the individual parts or their relative assembly in order to meet specific requirements or conditions. Such changes and modifications may be made without departure from the scope and spirit of the invention, as set forth in the following claims.

I claim:

1. A sample preparation device for mixing a sample and a reagent comprising a first container defining a sample holding chamber, the first container being disposed in a second container such that the sample chamber is disposed within the second container and a reagent chamber is defined between the first and second containers, an upper wall sealingly connecting the first and second containers above said reagent chamber, thereby providing a closed reagent chamber, a passageway being provided through said first container and providing fluid communication between the sample and reagent chambers, a closure means disposed in the passageway for closing said passageway, said closure means being removed from said passageway to thereby open said passageway in response to centrifugal forces generated during centrifugation of said device, whereby the sample is permitted to mix with the reagent in the reagent chamber during centrifugation and the sample and reagent mixture is returned to the sample chamber as a result of air pressure in the reagent chamber.

2. A sample preparation device for mixing a sample with a reagent, comprising:

(a) an outer container;

(b) an inner container disposed within said outer container to form a reagent chamber between said inner and outer containers, said inner container having a sample chamber disposed within said outer container, and having a passageway providing fluid communication between said sample and reagent chambers;

(c) a closure means disposed in said passageway for closing said passageway, said closure means being removable from said passageway to thereby open said passageway, whereby the sample is permitted to mix with the reagent in the reagent chamber and the sample and reagent mixture is then returned to the sample chamber as a result of fluid pressure in said reagent chamber.

3. A device as defined in claim 2, in which said closure means comprises a plug closely receivable within said passageway.

4. A device as defined in claim 2, further including an overflow chamber in communication with said sample.

5. A device as defined in claim 2, in which said sample chamber includes first and second portions in fluid communication via an interconnecting passageway disposed between said first and second portions.

6. A device as defined in claim 5, further comprising means for closing said interconnecting passageway.

7. A sample preparation device usable with a centrifuge for mixing a sample with a reagent comprising:

(a) an outer container;

(b) an inner container disposed within said outer container to form a reagent chamber between said inner and outer containers, said inner container having a sample chamber, comprising first and second portions interconnected by a first passageway, said sample chamber being disposed within said outer container and having a second passageway providing fluid communication between said second portion of said sample chamber and said reagent chamber;

(c) an upper wall sealably interconnecting said inner and outer containers above said reagent chamber;

(d) a first closure means for closing said first passageway; and (e) a second closure means disposed in said second passageway for closing said second passageway, said first and second closure means being removed from said first and second passageway, to thereby open said passageways in response to centrifugal forces generated during centrifugation of said device, whereby the sample contained in said first and second portions of said sample chamber is permitted to mix with the reagent in the reagent chamber during centrifugation and the sample and reagent mixture is returned to the sample chamber as a result of air pressure in said reagent chamber.

8. A device as defined in claim 7, further including an overflow chamber in communication with said first portion of said sample chamber.

9. A device as defined in claim 7, in which said first closure means comprise a first plug closely receivable within said first passageway and in which said second closure means comprise a second plug closely receivable within said second passageway.

* * * * *